US012451607B2

(12) United States Patent
Hashiguchi

(10) Patent No.: US 12,451,607 B2
(45) Date of Patent: Oct. 21, 2025

(54) ANTENNA ASSEMBLY

(71) Applicant: Japan Aviation Electronics Industry, Limited, Tokyo (JP)

(72) Inventor: Osamu Hashiguchi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 253 days.

(21) Appl. No.: 17/876,669

(22) Filed: Jul. 29, 2022

(65) Prior Publication Data

US 2023/0078606 A1 Mar. 16, 2023

(30) Foreign Application Priority Data

Sep. 10, 2021 (JP) ................................ 2021-147434

(51) Int. Cl.
*H01Q 9/04* (2006.01)

(52) U.S. Cl.
CPC ........... *H01Q 9/045* (2013.01); *H01Q 9/0421* (2013.01)

(58) Field of Classification Search
CPC ........ H01Q 9/045; H01Q 9/0421; H01Q 9/42; H01Q 1/1207; H01Q 5/371
See application file for complete search history.

(56) References Cited

U.S. PATENT DOCUMENTS 5,081,445 A * 1/1992 Gill .................... G08B 13/2437 340/572.1
5,288,235 A * 2/1994 Sobhani ............... H05K 3/4007 174/254
6,018,299 A * 1/2000 Eberhardt ........ G06K 19/07786 361/748
6,233,818 B1 * 5/2001 Finn ................ G06K 19/07779 235/382
7,466,272 B1 * 12/2008 Su ........................ H01Q 1/2266 343/702
10,236,619 B1 * 3/2019 Sato ..................... H01R 13/518
2003/0174092 A1 * 9/2003 Sullivan ................ H01Q 5/335 343/702
2005/0224110 A1 * 10/2005 Yoshikawa ....... H01L 31/02008 136/200
2007/0040750 A1 * 2/2007 Tai ........................ H01Q 1/2266 343/702
2007/0075902 A1 * 4/2007 Tai ........................ H01Q 9/0421 343/702

(Continued)

FOREIGN PATENT DOCUMENTS

JP H03-48891 U 5/1991
JP 2001-289358 A 10/2001

(Continued)

OTHER PUBLICATIONS

Office Action issued in Japanese Patent Application No. 2021-147434, Dated Apr. 2, 2025 (with English translation).

*Primary Examiner* — David E Lotter
*Assistant Examiner* — Bamidele A Immanuel
(74) *Attorney, Agent, or Firm* — Collard & Roe, P.C.

(57) ABSTRACT

An antenna assembly comprises an antenna body made of metal plate, a pressing portion and a conductive film. The antenna body is provided with a pressed portion. The pressing portion presses the conductive film against the pressed portion and thereby the conductive film and the pressed portion are electrically connected to each other.

6 Claims, 11 Drawing Sheets

(56) References Cited

U.S. PATENT DOCUMENTS

2007/0109200 A1* 5/2007 Su .......................... H01Q 5/371 343/702
2008/0111745 A1* 5/2008 Takada ................. H01Q 9/0457 343/700 MS
2008/0180330 A1* 7/2008 Wei-Shan .............. H01Q 5/371 343/700 MS
2009/0027277 A1* 1/2009 Su ........................ H01Q 9/0421 343/700 MS
2009/0135072 A1* 5/2009 Ke ........................... H01Q 1/36 343/700 MS
2010/0019974 A1* 1/2010 Hung ..................... H01Q 5/321 343/700 MS
2010/0147958 A1* 6/2010 Martinent ........ G06K 19/07749 29/601
2010/0283685 A1* 11/2010 Tsai ....................... H01Q 1/243 343/700 MS
2010/0315308 A1* 12/2010 Yang ...................... H01Q 5/371 343/860
2011/0175794 A1* 7/2011 Tai ......................... H01Q 5/378 343/908
2012/0050119 A1* 3/2012 Wang ................... H01Q 1/2266 343/728
2012/0081264 A1* 4/2012 Wang ..................... H01Q 21/30 343/905
2012/0154230 A1* 6/2012 Wang ................... H01Q 9/0421 343/725
2013/0241786 A1* 9/2013 Ko ......................... H01Q 1/243 343/767
2014/0043200 A1* 2/2014 Wei .......................... H01Q 1/48 343/846
2014/0125527 A1* 5/2014 Tai ......................... H01Q 5/364 343/700 MS
2014/0342592 A1* 11/2014 Ashibu .................. H01R 12/88 439/267
2015/0278675 A1* 10/2015 Finn ................. G06K 19/07783 29/601
2015/0333396 A1* 11/2015 Tai ........................... H01Q 9/42 343/905
2018/0226740 A1* 8/2018 Sato ..................... H01R 13/405
2019/0317553 A1* 10/2019 Cho ...................... G06F 1/1626
2020/0028263 A1* 1/2020 Pueschner ............ H01Q 1/2225
2020/0244000 A1* 7/2020 Naito ................... H01R 13/506
2021/0167532 A1* 6/2021 Ashibu ................ H01R 13/112
2021/0227711 A1* 7/2021 Nakamura ........... H05K 5/0286
2021/0351533 A1* 11/2021 Nishitani ............. H01R 13/113

FOREIGN PATENT DOCUMENTS

JP 2001-352647 A 12/2001
JP 2011114721 A * 6/2011 .............. H04M 1/02

* cited by examiner

ANTENNA ASSEMBLY

CROSS REFERENCE TO RELATED APPLICATIONS

This application is based on and claims priority under 35 U.S.C. § 119 to Japanese Patent Application No. JP2021-147434 filed Sep. 10, 2021, the contents of which are incorporated herein in their entirety by reference.

BACKGROUND OF THE INVENTION

This invention relates to an antenna assembly comprising a conductive film.

Referring to FIG. 22, US2012/0050119A (Patent Document 1) discloses an antenna 900 including an antenna assembly 905 of this type. The antenna 900 comprises the antenna assembly 905 and a coaxial cable 930. The antenna assembly 905 comprises an antenna body 910 and a conductive film 950. The antenna body 910 has a feed line connection portion 914 and a ground portion 916. The coaxial cable 930 comprises a center conductor 934 and an outer conductor 936. The center conductor 934 is connected to the feed line connection portion 914. The outer conductor 936 is connected to the ground portion 916. The conductive film 950 is connected to the ground portion 916. Since the antenna assembly 905 has the conductive film 950 which is connected to the ground portion 916, the antenna assembly 905 has an enlarged ground plane and thereby has improved antenna characteristics.

In the antenna assembly 905 of Patent Document 1, the conductive film 950 is required to be fixed to the ground portion 916 of the antenna body 910 by soldering or the like. Thus, such an antenna assembly is required to facilitate operation of fixing a conductive film to an antenna body.

SUMMARY OF THE INVENTION

It is therefore an object of the present invention to provide an antenna assembly which facilitates operation of fixing a conductive film to an antenna body.

One aspect of the present invention provides an antenna assembly comprising an antenna body made of metal plate, a pressing portion and a conductive film. The antenna body is provided with a pressed portion. The pressing portion presses the conductive film against the pressed portion and thereby the conductive film and the pressed portion are electrically connected to each other.

The antenna assembly of the present invention is configured as follows: the antenna assembly comprises the antenna body made of metal plate, the pressing portion and the conductive film; the antenna body is provided with the pressed portion; and the pressing portion presses the conductive film against the pressed portion. Accordingly, the antenna assembly of the present invention is configured so that the conductive film can be fixed to the antenna body without soldering or the like. Thus, the antenna assembly of the present invention can facilitate operation of fixing the conductive film to the antenna body.

An appreciation of the objectives of the present invention and a more complete understanding of its structure may be had by studying the following description of the preferred embodiment and by referring to the accompanying drawings.

Figure 1:
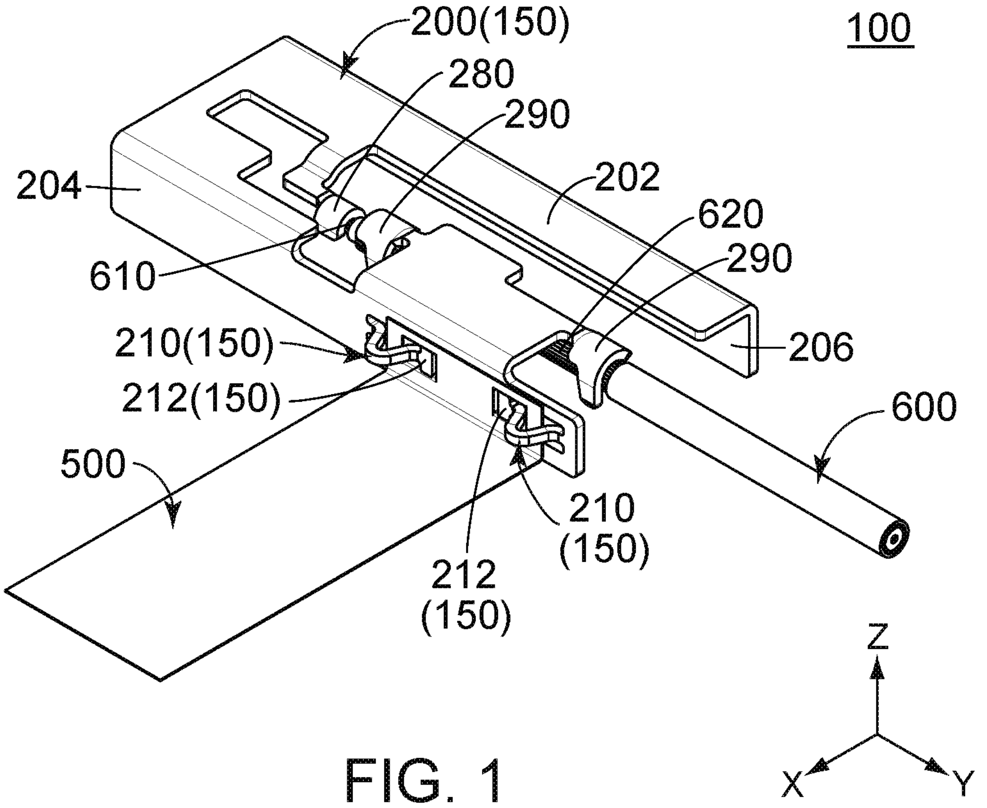
FIG. 1 is a perspective view showing an antenna assembly according to a first embodiment of the present invention. In the figure, an electrical wire is connected to a feed line connection portion of an antenna body and a pressing portion presses a conductive film against a pressed portion.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

As shown in FIG. 1, an antenna assembly 100 according to a first embodiment of the present invention comprises an antenna member 150 made of metal plate, and a conductive film 500.

Figure 6:
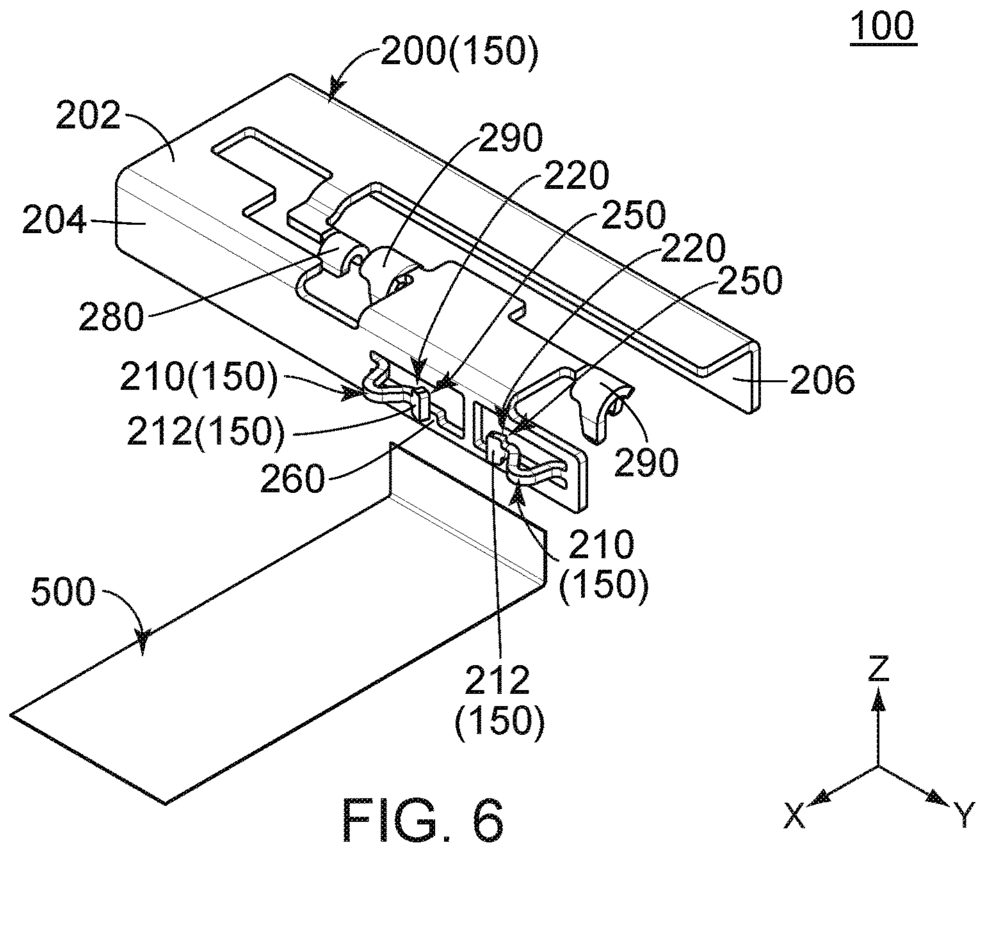
FIG. 6 is another perspective view showing the antenna assembly of FIG. 5. In the figure, the conductive film is separated from an antenna member and the cuts of the conductive film are omitted.

Referring to FIG. 6, the antenna member 150 of the present embodiment is formed by punching out a single metal plate, followed by bending it. The antenna member 150 has an antenna body 200, two arm portions 210 and two pressing portions 212. In other words, the antenna assembly 100 comprises the antenna body 200 made of metal plate, the pressing portions 212 and the conductive film 500. However, the present invention is not limited thereto, but the antenna assembly 100 should comprise the antenna body 200 made of metal plate, the pressing portion 212 and the conductive film 500. The antenna assembly 100 further has the arm portions 210. However, the present invention is not limited thereto, but the antenna assembly 100 may have the single arm portion 210.

Referring to FIG. 6, the antenna body 200 of the present embodiment has an upper portion 202, a first side portion 204 and a second side portion 206.

Referring to FIG. 6, the upper portion 202 of the present embodiment defines an upper end of the antenna body 200 in an up-down direction. In the present embodiment, the up-down direction is a Z-direction. Specifically, upward is a positive Z-direction while downward is a negative Z-direction. The upper portion 202 is provided with a feed line connection portion 280 and two outer conductor connection portions 290.

Figure 8:
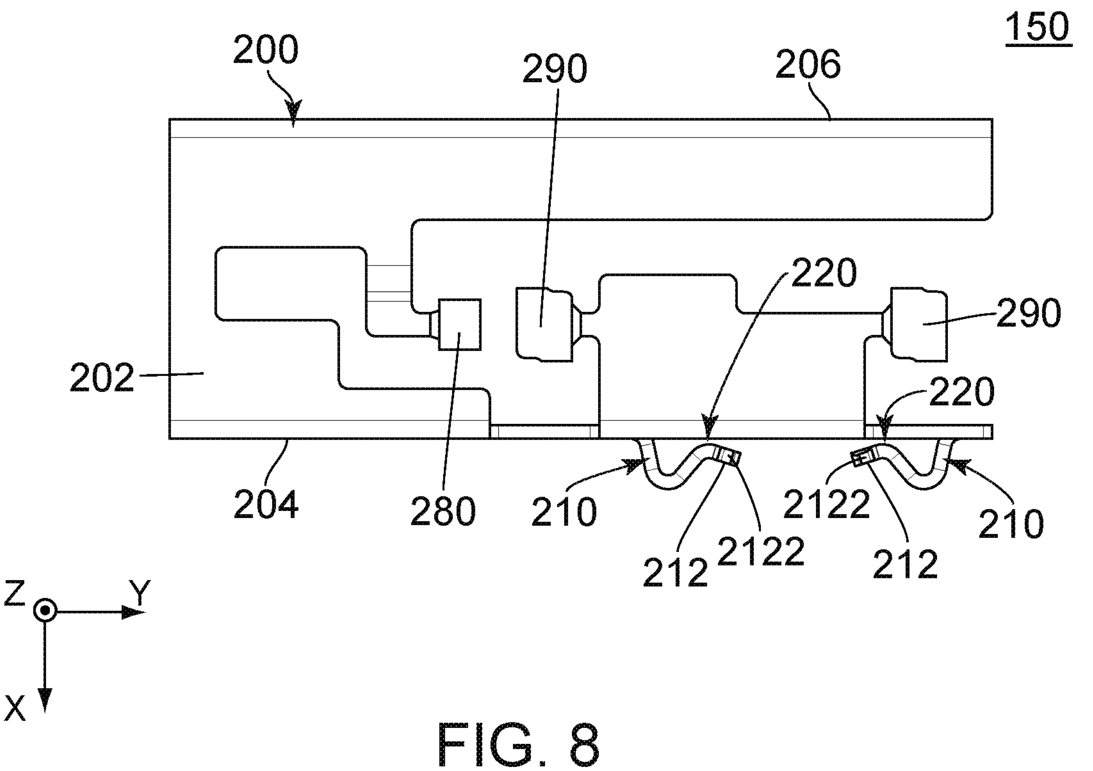
FIG. 8 is a top view showing the antenna member of FIG. 7.

As shown in FIG. 8, the feed line connection portion 280 of the present embodiment is positioned at a position same as any of positions of the outer conductor connection portions 290 in a front-rear direction. In the present embodiment, the front-rear direction is an X-direction. Specifically, it is assumed that forward is a positive X-direction while rearward is a negative X-direction. The feed line connection portion 280 is positioned leftward beyond any of the outer conductor connection portions 290 in a right-left direction. In the present embodiment, the right-left direction is a Y-direction. Specifically, rightward is a positive Y-direction while leftward is a negative Y-direction. As shown in FIG. 1, an electrical wire 600 is connected to the feed line connection portion 280. More specifically, a center conductor 610 of the electrical wire 600 is connected to the feed line connection portion 280. The antenna member 150, to which the electrical wire 600 is connected, forms an antenna.

As shown in FIG. 8, each of the outer conductor connection portions 290 of the present embodiment is positioned at the position same as the position of the feed line connection portion 280 in the front-rear direction. Each of the outer conductor connection portions 290 is positioned rightward beyond the feed line connection portion 280 in the right-left direction. As shown in FIG. 1, the electrical wire 600 is connected to any of the outer conductor connection portions 290. More specifically, an outer conductor 620 of the electrical wire 600 is connected to any of the outer conductor connection portions 290.

As shown in FIG. 6, the first side portion 204 of the present embodiment has a plate-like shape perpendicular to the front-rear direction. The first side portion 204 defines a front end of the antenna body 200 in the front-rear direction.

Figure 7:
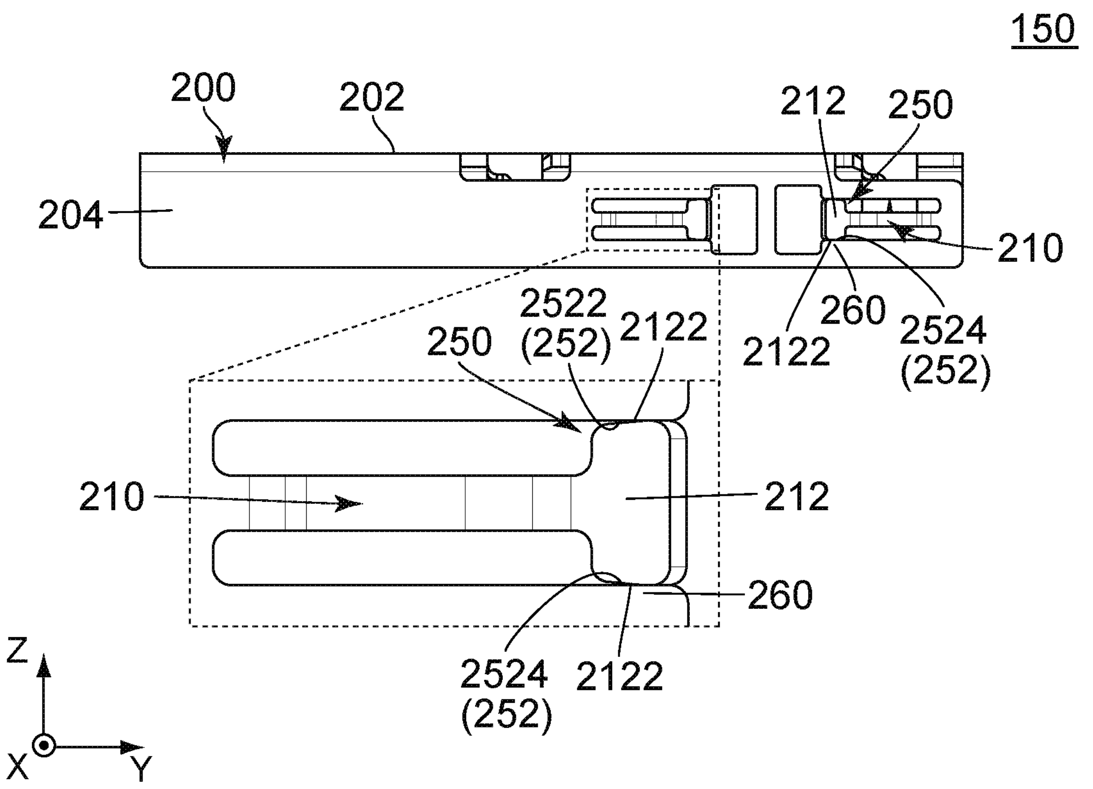
FIG. 7 is a front view showing the antenna member which is included in the antenna assembly of FIG. 6. In the figure, a part of the antenna member is enlarged and illustrated.

As shown in FIG. 7, the first side portion 204 of the present embodiment is formed with two receiving holes 250. In other words, the antenna body 200 is formed with the receiving holes 250. However, the present invention is not limited thereto, but the antenna body 200 may be formed with the single receiving hole 250.

Figure 4:
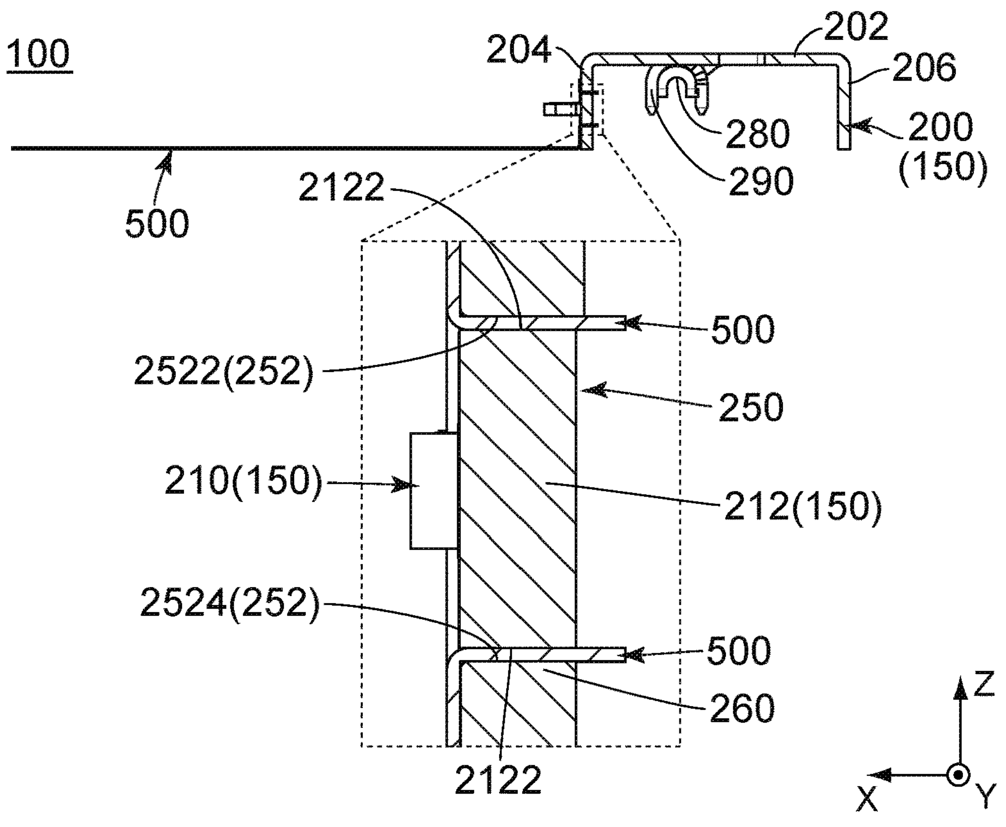
FIG. 4 is a cross-sectional view showing the antenna assembly of FIG. 3, taken along line A-A. In the figure, a part of the antenna assembly is enlarged and illustrated.

As shown in FIG. 7, each of the receiving holes 250 of the present embodiment pieces the first side portion 204 in the front-rear direction. In other words, each of the receiving holes 250 pieces the antenna body 200 in the front-rear direction. Each of the receiving holes 250 is formed by cutting and bending a part of the metal plate when the antenna member 150 is formed. The receiving holes 250 are arranged in the right-left direction. As shown in FIG. 4, parts of the conductive film 500 are positioned in the receiving holes 250, respectively. Each of the receiving holes 250 is positioned below the feed line connection portion 280 in the up-down direction.

As shown in FIG. 7, each of the receiving holes 250 of the present embodiment has a pressed portion 252. In other words, the antenna body 200 is provided with the pressed portions 252. However, the present invention is not limited thereto, but the antenna body 200 should be provided with the pressed portion 252.

As shown in FIG. 7, the pressed portion 252 of the present embodiment is provided at an edge of the receiving hole 250. The pressed portion 252 includes an upper pressed portion 2522 and a lower pressed portion 2524.

As shown in FIG. 4, the upper pressed portion 2522 of the present embodiment faces downward in the up-down direction. The upper pressed portion 2522 is a part of an upper edge of the receiving hole 250. The upper pressed portion 2522 is positioned above the lower pressed portion 2524 in the up-down direction.

As shown in FIG. 4, the lower pressed portion 2524 of the present embodiment faces upward in the up-down direction. The lower pressed portion 2524 is a part of a lower edge of the receiving hole 250. The lower pressed portion 2524 is positioned below the upper pressed portion 2522 in the up-down direction.

As shown in FIG. 7, the first side portion 204 of the present embodiment has two deformable portions 260.

As shown in FIG. 7, the deformable portions 260 of the present embodiment are arranged in the right-left direction. Each of the deformable portions 260 is resiliently deformable. The deformable portions 260 correspond to the receiving holes 250, respectively. Each of the deformable portions 260 is positioned below the corresponding receiving hole 250 in the up-down direction. Each of the deformable portions 260 is positioned below the pressed portion 252 of the corresponding receiving hole 250 in the up-down direction. More specifically, each of the deformable portions 260 is positioned below the lower pressed portion 2524 of the corresponding receiving hole 250 in the up-down direction. Each of the deformable portions 260 is positioned below the upper portion 202 in the up-down direction. As shown in FIG. 4, each of the deformable portions 260 is positioned below the feed line connection portion 280 in the up-down direction. Each of the deformable portions 260 is positioned below any of the outer conductor connection portions 290 in the up-down direction.

As shown in FIG. 6, the second side portion 206 of the present embodiment has a plate-like shape perpendicular to the front-rear direction. The second side portion 206 defines a rear end of the antenna body 200 in the front-rear direction. The second side portion 206 is positioned rearward of the first side portion 204 in the front-rear direction. As shown in FIG. 4, the first side portion 204 and the second side portion 206 are positioned at positions same as each other in the up-down direction.

As shown in FIG. 8, each of the arm portions 210 of the present embodiment extends from the first side portion 204. Each of the arm portions 210 extends in the right-left direction from the first side portion 204. In other words, each of the arm portions 210 extends from the antenna body 200. Each of the arm portions 210 is formed by cutting and bending the part of the metal plate when the antenna member 150 is formed. Each of the arm portions 210 protrudes forward in the front-rear direction beyond the first side portion 204. As shown in FIG. 7, the arm portions 210 correspond to the receiving holes 250, respectively. Each of the arm portions 210 is positioned at a position same as a position of the corresponding receiving hole 250 in the up-down direction. The arm portion 210 is positioned above the deformable portion 260 in the up-down direction. The arm portions 210 correspond to the deformable portions 260, respectively. Each of the arm portions 210 is positioned above the corresponding deformable portion 260 in the up-down direction.

Referring to FIG. 7, each of the pressing portions 212 of the present embodiment is formed by cutting and bending the part of the metal plate when the antenna member 150 is formed. Each of the pressing portions 212 has a plate-like shape. Each of the pressing portions 212 has a tapered shape. Specifically, each of the pressing portions 212 has the tapered shape which is tapered toward the arm portion 210. In detail, opposite side surfaces 2122 of the pressing portion 212 in the up-down direction are tapered. Specifically, the opposite side surfaces 2122 of the pressing portion 212 are tapered toward the arm portion 210. The pressing portion 212 is supported by the arm portion 210. More specifically, the pressing portions 212 correspond to the arm portions 210, respectively, and each of the pressing portions 212 is supported by the corresponding arm portion 210. Each of the pressing portions 212 is integrally formed with the corresponding arm portion 210. In other words, each of the pressing portions 212 is integrally formed with the antenna body 200. The pressing portion 212 has a size greater than a size of the corresponding arm portion 210 in the up-down direction. The pressing portions 212 correspond to the receiving holes 250, respectively. Each of the pressing portions 212 is positioned at a position same as the position of the corresponding receiving hole 250 in the up-down direction. Each of the pressing portions 212 is positioned at a position same as a position of the corresponding receiving hole 250 in the right-left direction. The pressing portions 212 correspond to the pressed portions 252, respectively. Each of the pressing portions 212 is positioned below the upper pressed portion 2522 of the corresponding pressed portion 252 in the up-down direction. Each of the pressing portions 212 is positioned above the lower pressed portion 2524 of the corresponding pressed portion 252 in the up-down direction. The pressing portions 212 correspond to the deformable portions 260, respectively. Each of the pressing portions 212 is positioned above the corresponding deformable portion 260 in the up-down direction.

Referring to FIG. 4, the pressing portion 212 presses the conductive film 500 against the pressed portion 252 and thereby the conductive film 500 and the pressed portion 252 are electrically connected to each other. More specifically, the side surface 2122, which is positioned at an upper side of the pressing portion 212, presses the conductive film 500 against the upper pressed portion 2522 of the corresponding pressed portion 252 along the up-down direction while the side surface 2122, which is positioned at a lower side of the pressing portion 212, presses the conductive film 500 against the lower pressed portion 2524 of the corresponding pressed portion 252 along the up-down direction, and thereby the conductive film 500 and the corresponding pressed portion 252 are electrically connected to each other.

The antenna assembly 100 of the present embodiment has two sets each consisting of the pressing portion 212 and the pressed portion 252, and each of the two sets connects the antenna body 200 and the conductive film 500 to each other. Thus, the antenna assembly 100 of the present embodiment can ensure reliable electrical connection between the antenna body 200 and the conductive film 500 in comparison with an assumption where the antenna body 200 and the conductive film 500 are electrically connected to each other only by a single set of the pressing portion 212 and the pressed portion 252.

Referring to FIG. 4, the pressing portion 212 is partially received in the receiving hole 250 in a state where a part of the conductive film 500 is put between the pressing portion 212 and the pressed portion 252, and thereby the pressing portion 212 presses the conductive film 500 against the pressed portion 252. More specifically, each of the pressing portions 212 is partially received in the corresponding receiving hole 250 in a state where the part of the conductive film 500 is put between the pressing portion 212 and the corresponding pressed portion 252 in the up-down direction, and thereby each of the pressing portions 212 presses the conductive film 500 against the corresponding pressed portion 252 along the up-down direction.

Figure 9:
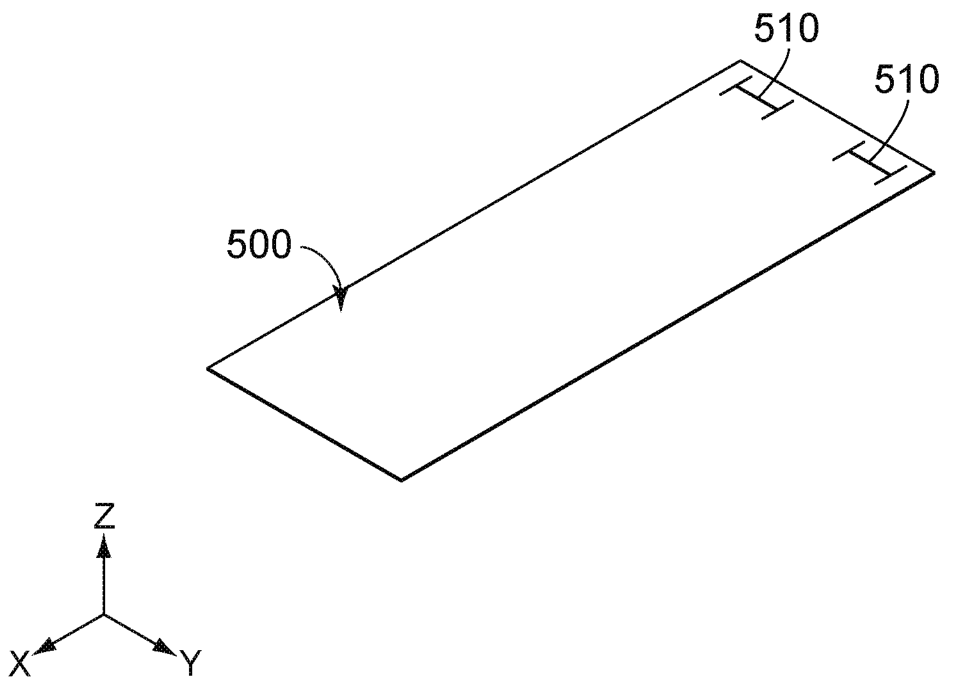
FIG. 9 is a perspective view showing the conductive film which is included in the antenna assembly of FIG. 1.

As shown in FIG. 9, the conductive film 500 of the present embodiment is a flat conductive member. More specifically, the conductive film 500 is a copper tape or copper foil. The conductive film 500 is connected to, for example, a metal housing (not shown) on which the antenna assembly 100 is mounted. The conductive film 500 is formed with two incisions 510. The incisions 510 correspond to the receiving holes 250, the arm portions 210 and the pressing portions 212, respectively. However, the present invention is not limited thereto, but the conductive film 500 may have no incision 510.

(Operation of Fixing the Conductive Film to the Antenna Body)

Hereinafter, description will be made in detail about operation of fixing the conductive film 500 to the antenna body 200.

First, referring to FIGS. 7 to 9, the antenna member 150 and the conductive film 500 are prepared. In a state before the conductive film 500 is fixed to the antenna member 150, the antenna member 150 is configured so that each of the pressing portions 212 is positioned forward in the front-rear direction beyond the corresponding receiving hole 250 while there are spaces 220 each of which is positioned between the first side portion 204 and the pressing portion 212.

Next, referring to FIGS. 6 and 9, the conductive film 500 is folded so that a section of the conductive film 500 extends upward. At this time, each of the incisions 510 is positioned on the section of the conductive film 500. After that, referring to FIGS. 6 and 8, the conductive film 500 is arranged below the antenna member 150 so that the section of the conductive film 500 is positioned just below each of the spaces 220. Thus, the antenna assembly 100 results in a state shown in FIG. 6.

After that, the conductive film 500 is moved upward relative to the antenna member 150. Thus, the antenna assembly 100 changes its state into a state shown in FIG. 5. At this time, each of the incisions 510 (see FIG. 9) of the conductive film 500 is positioned between the corresponding pressing portion 212 and the corresponding receiving hole 250 (see FIG. 6).

Figure 2:
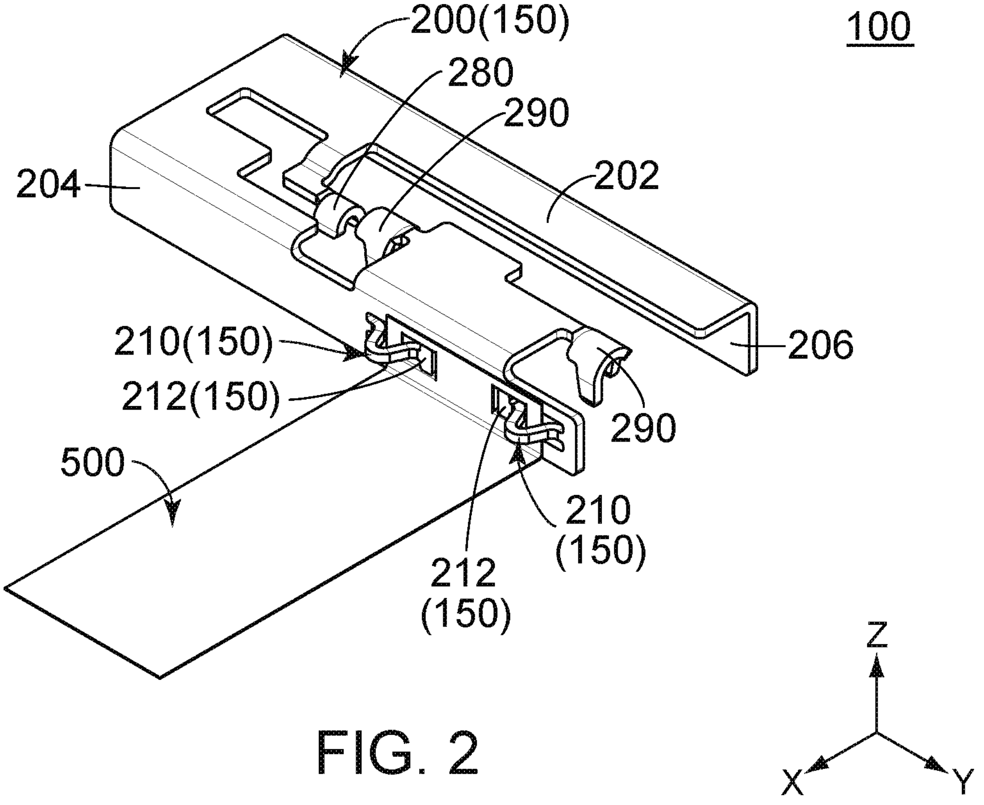
FIG. 2 is another perspective view showing the antenna assembly of FIG. 1. In the figure, the electrical wire is omitted.
Figure 3:
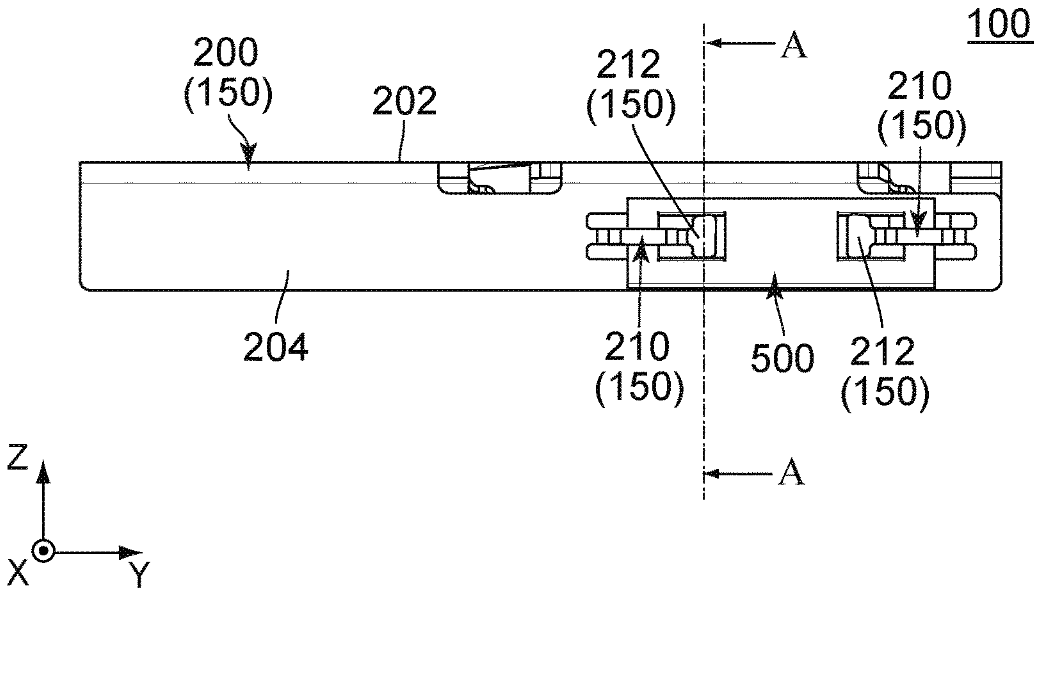
FIG. 3 is a front view showing the antenna assembly of FIG. 2.
Figure 5:
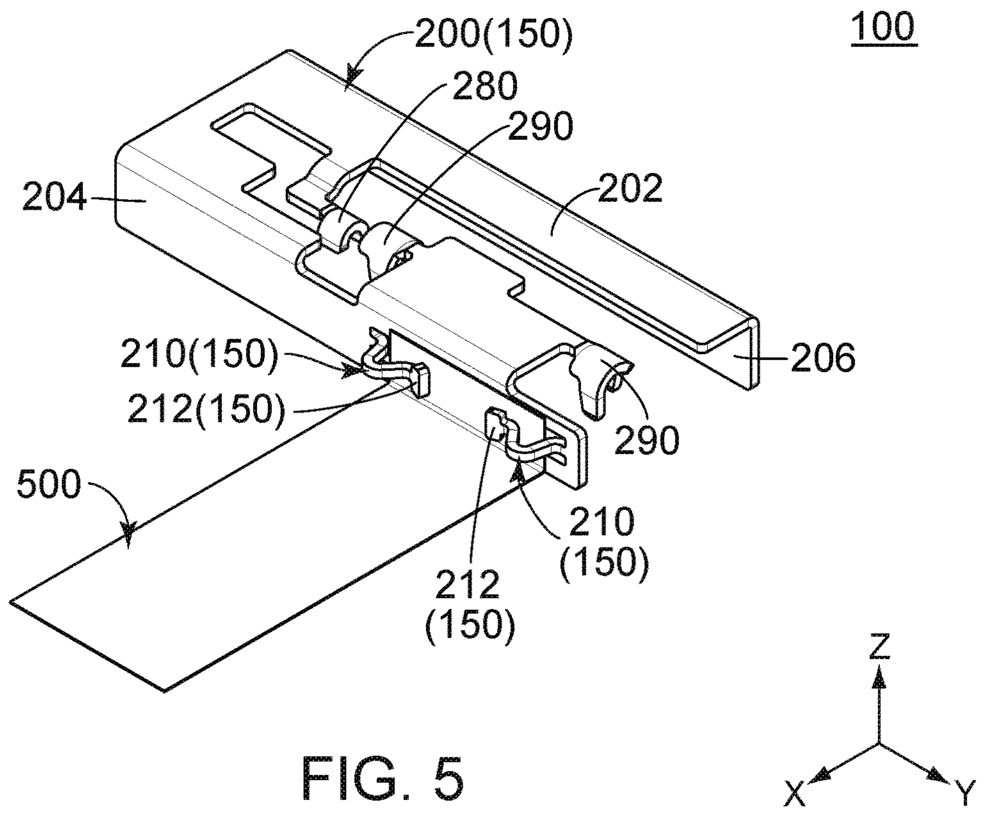
FIG. 5 is another perspective view showing the antenna assembly of FIG. 2. In the figure, the pressing portion does not press the conductive film against the pressed portion and cuts of the conductive film are omitted.

Under the state shown in FIG. 5, each of the pressing portions 212 is moved rearward by pushing the corresponding arm portion 210 rearward. Thus, each of the parts of the conductive film 500 is pushed into the corresponding receiving hole 250 and thereby the antenna assembly 100 changes its state into a state shown in each of FIGS. 2 to 4. In this state, the pressing portion 212 presses the conductive film 500 against the pressed portion 252 and thereby the conductive film 500 and the pressed portion 252 are electrically connected to each other. Accordingly, the antenna assembly 100 of the present embodiment is configured so that the conductive film 500 can be fixed to the antenna body 200 without soldering or the like. Thus, the antenna assembly 100 of the present embodiment can facilitate operation of fixing the conductive film 500 to the antenna body 200.

Each of the arm portions 210 is plastically deformed in the aforementioned state. The plastic deformation maintains a state where the pressing portion 212 presses the conductive film 500 against the pressed portion 252.

Further, in the aforementioned state, each of the deformable portions 260 is resiliently deformed by the pressing of the conductive film 500 against the lower pressed portion 2524 of the pressed portion 252. The conductive film 500 is tightly sandwiched by the pressing portion 212 and the lower pressed portion 2524 of the pressed portion 252 by reaction force caused by the resilient deformation of the deformable portion 260. This further ensures the contact of the conductive film 500 and the pressed portion 252.

As described above, each of pressing portions 212 has the tapered shape. This enables the pressing portion 212 to press the conductive film 500 against the corresponding pressed portion 252 at some location of each of the opposite side surfaces 2122 in the right-left direction even if each of the pressing portion 212 and the corresponding receiving hole 250 has a variety of sizes in the up-down direction. Thus, the conductive film 500 and the pressed portion 252 can make reliable contact with each other.

Second Embodiment

Figure 10:
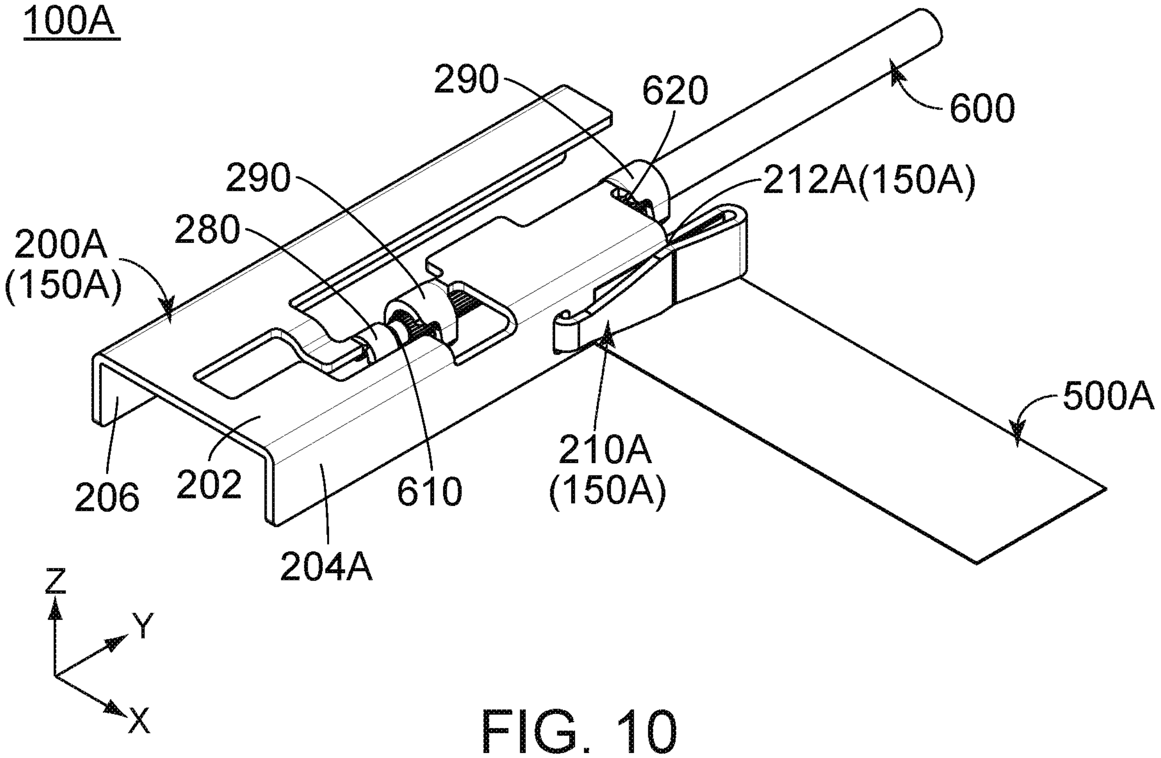
FIG. 10 is a perspective view showing an antenna assembly according to a second embodiment of the present invention. In the figure, an electrical wire is connected to a feed line connection portion of an antenna body, a pressing portion presses a conductive film against a pressed portion and a lock portion locks a locked portion.
Figure 11:
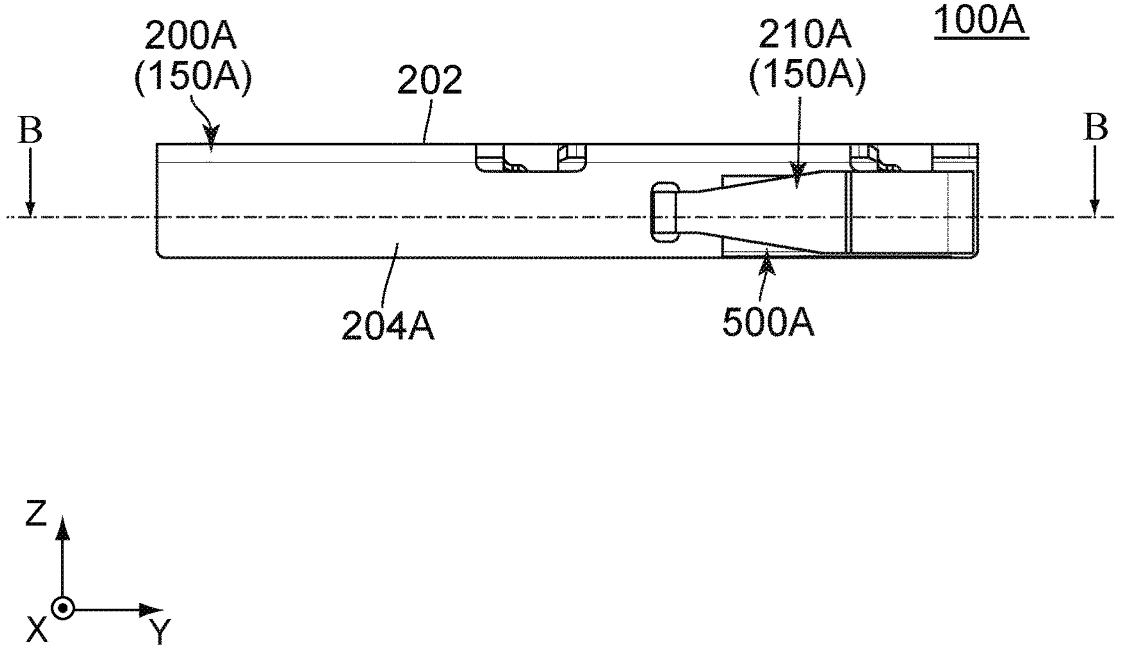
FIG. 11 is a front view showing the antenna assembly of FIG. 10.

As shown in FIG. 10, an antenna assembly 100A according to a second embodiment of the present invention comprises an antenna member 150A made of metal plate, and a conductive film 500A. The antenna assembly 100A according to the present embodiment has a structure similar to that of the antenna assembly 100 according to the aforementioned first embodiment as shown in FIG. 1. Accordingly, components of the antenna assembly 100A shown in FIGS. 10 to 21 which are same as those of the antenna assembly 100 of the first embodiment are referred by using reference signs same as those of the antenna assembly 100 of the first embodiment. As for directions and orientations in the present embodiment, expressions same as those of the first embodiment will be used hereinbelow.

Figure 13:
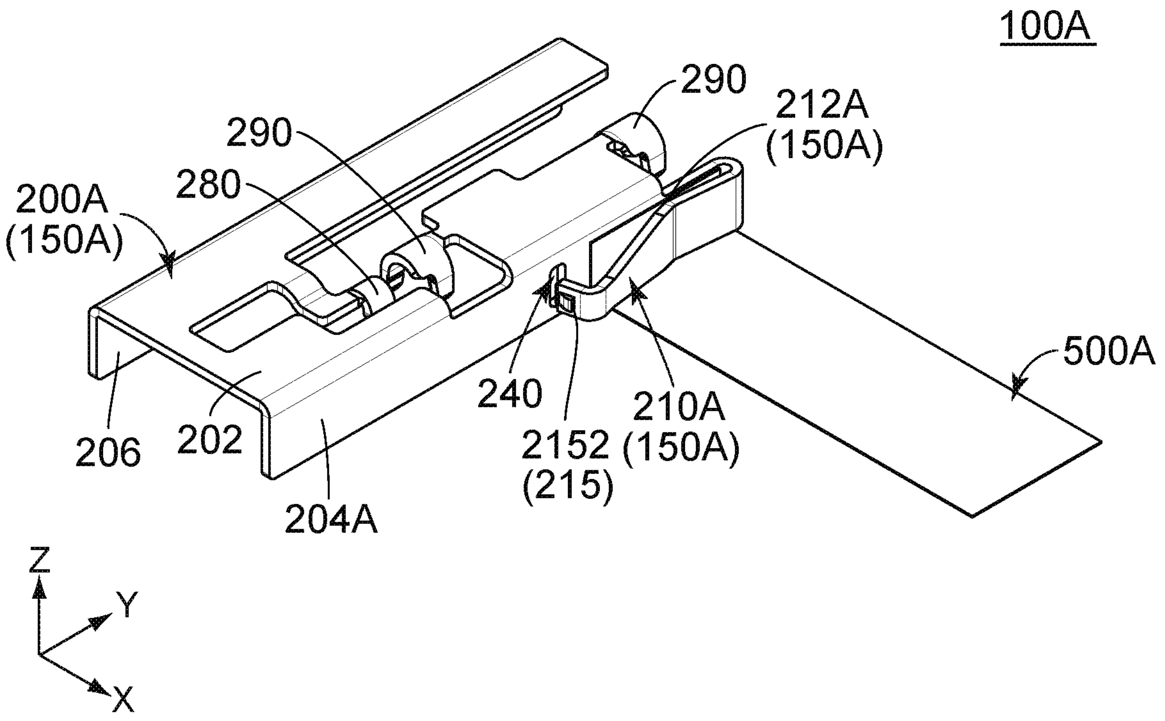
FIG. 13 is another perspective view showing the antenna assembly of FIG. 10. In the figure, the pressing portion does not press the conductive film against the pressed portion, the lock portion does not lock the locked portion and the electrical wire is omitted.
Figure 14:
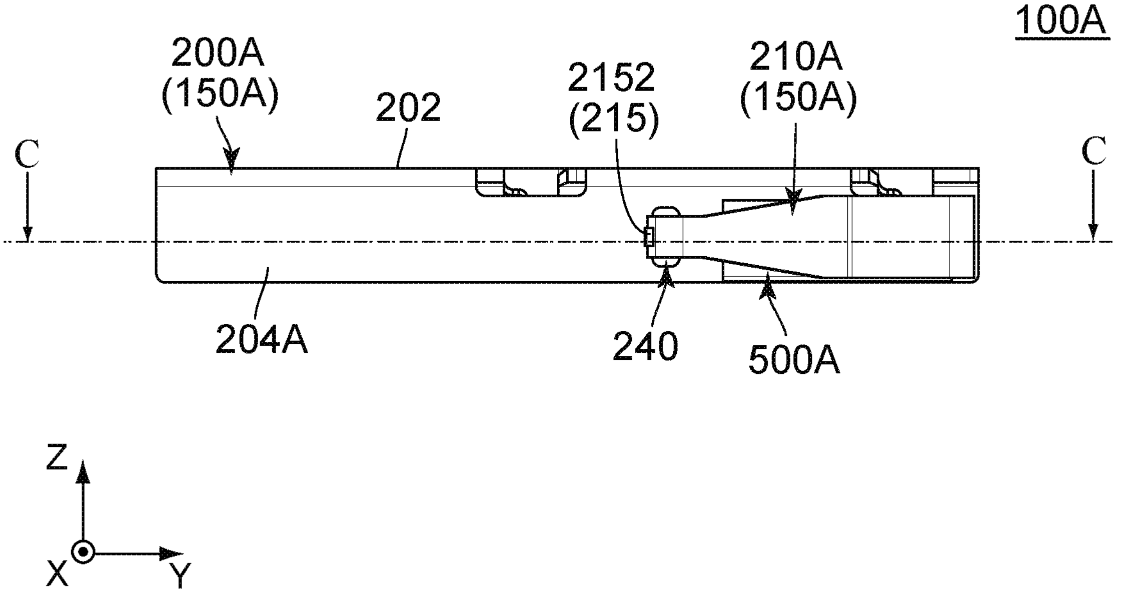
FIG. 14 is a front view showing the antenna assembly of FIG. 13.

Referring to FIG. 13, the antenna member 150A of the present embodiment is formed by punching out a single metal plate, followed by bending it. The antenna member 150A has an antenna body 200A, an arm portion 210A and a pressing portion 212A. In other words, the antenna assembly 100A comprises the antenna body 200A made of metal plate, the pressing portion 212A and the conductive film 500A. In addition, the antenna assembly 100A further has the arm portion 210A.

As shown in FIG. 13, the antenna body 200A of the present embodiment has an upper portion 202, a first side portion 204A and a second side portion 206. The upper portion 202 and the second side portion 206 of the present embodiment have structures same as those of the upper portion 202 and the second side portion 206 of the aforementioned first embodiment. Accordingly, detailed description thereabout is omitted.

As shown in FIG. 13, the first side portion 204A of the present embodiment has a plate-like shape perpendicular to the front-rear direction. The first side portion 204A defines a front end of the antenna body 200A in the front-rear direction.

Figure 15:
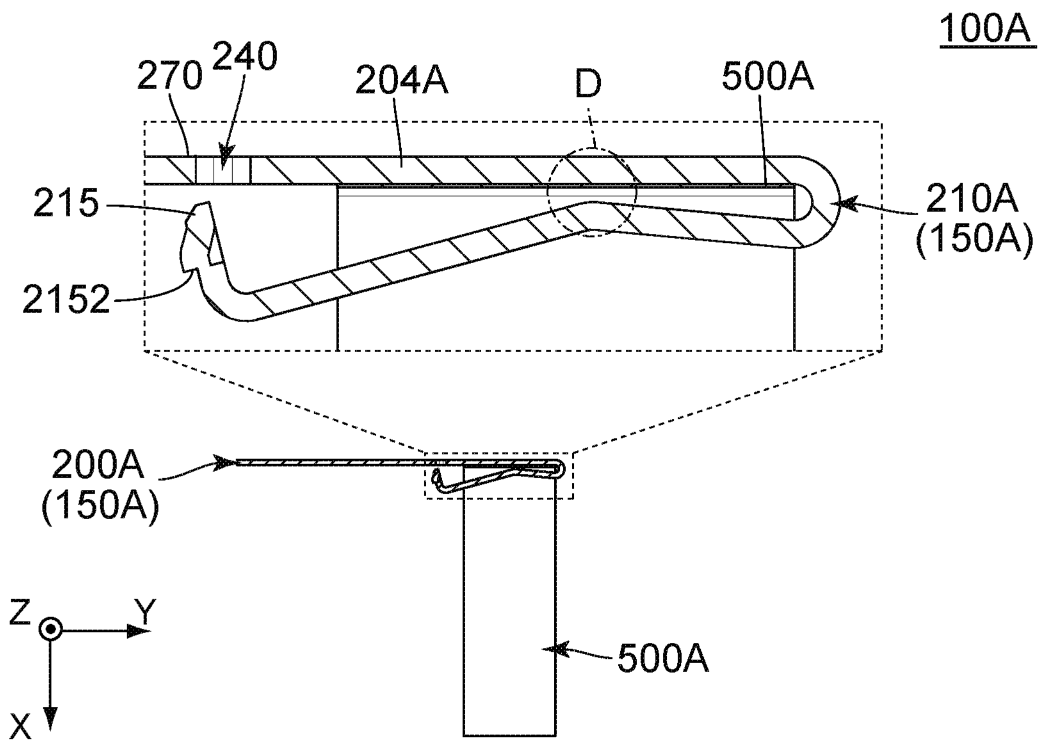
FIG. 15 is a cross-sectional view showing the antenna assembly of FIG. 14, taken along line C-C. In the figure, a part of the antenna assembly is enlarged and illustrated.
Figure 16:
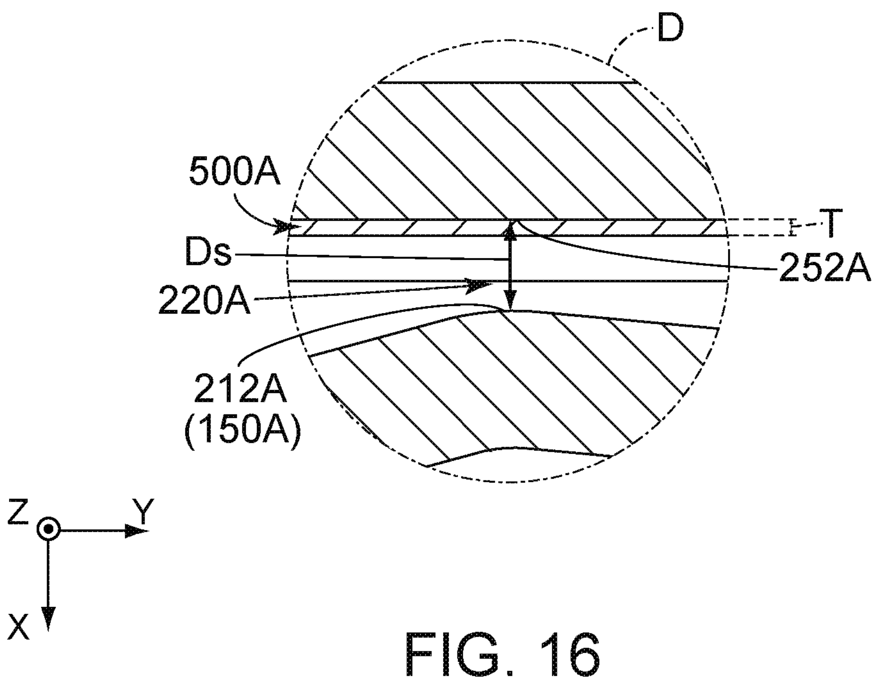
FIG. 16 is an enlarged view showing a part which is enclosed by dotted line D of FIG. 15.

As shown in FIGS. 15 and 16, the first side portion 204A is formed with a piercing hole 240 and a pressed portion 252A. In other words, the antenna body 200A is formed with the pressed portion 252A. It is noted that the first side portion 204A is not formed with a hole which is equivalent to the receiving hole 250 of the first embodiment.

As shown in FIG. 15, the piercing hole 240 of the present embodiment pierces the first side portion 204A in the front-rear direction.

Figure 17:
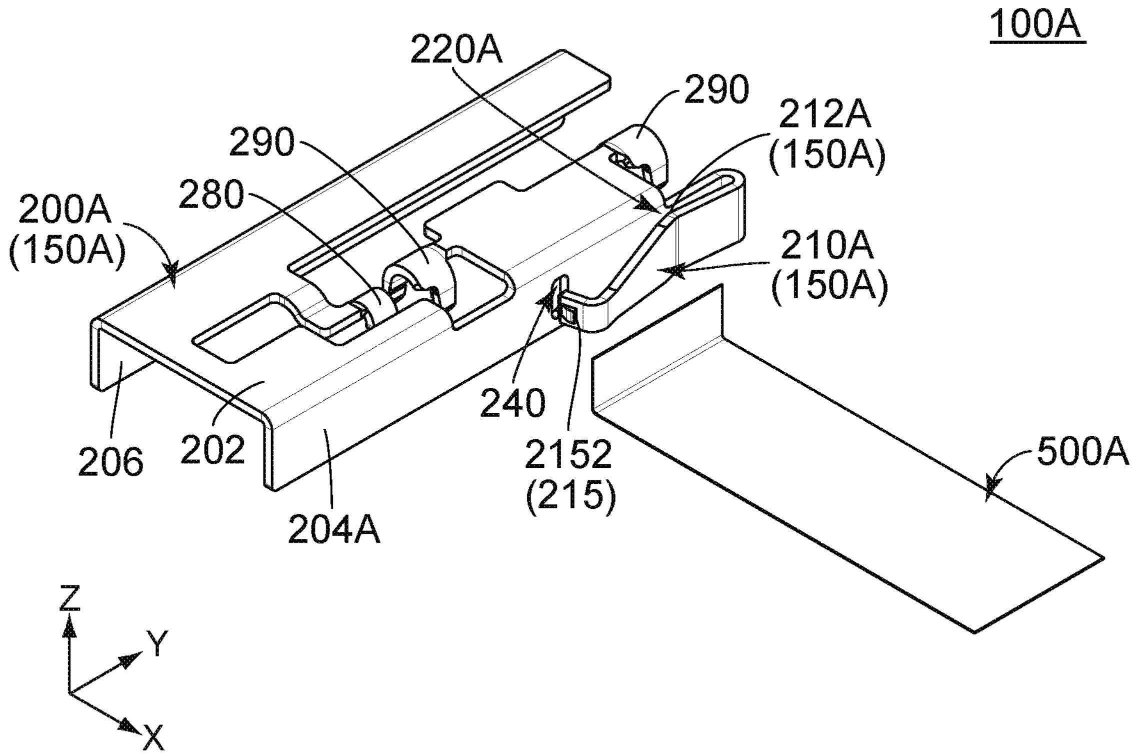
FIG. 17 is another perspective view showing the antenna assembly of FIG. 13. In the figure, the conductive film is separated from an antenna member.
Figure 18:
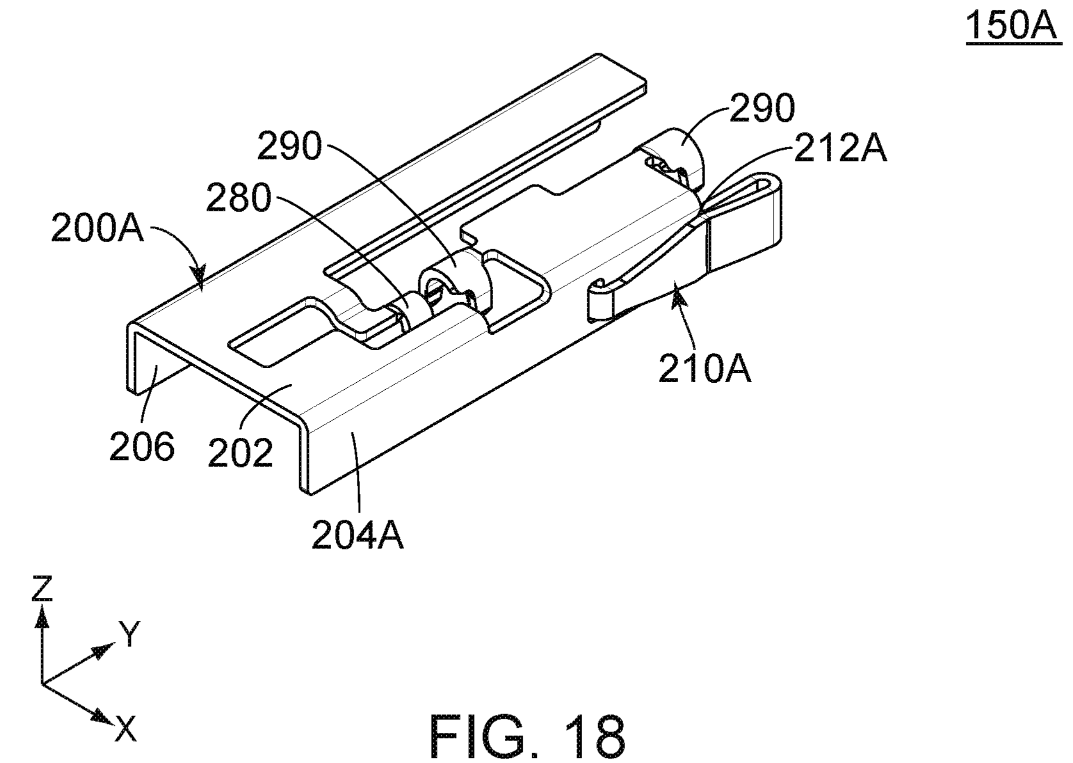
FIG. 18 is a perspective view showing the antenna member which is included in the antenna assembly of FIG. 10. In the figure, the lock portion locks the locked portion.
Figure 19:
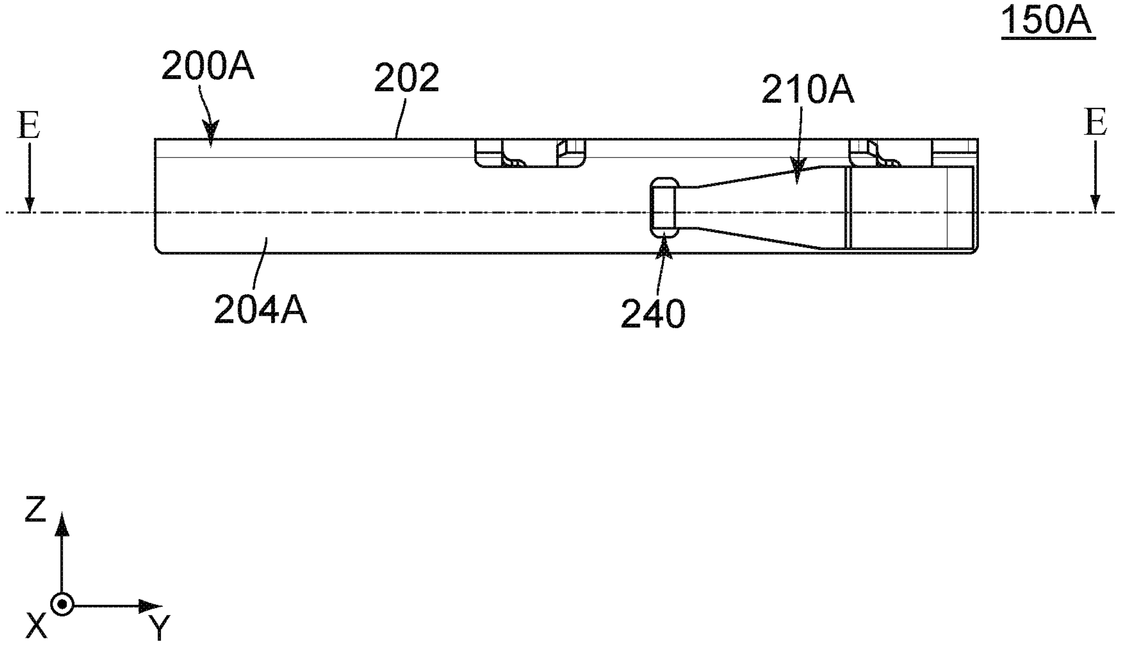
FIG. 19 is a front view showing the antenna member of FIG. 18.
Figure 21:
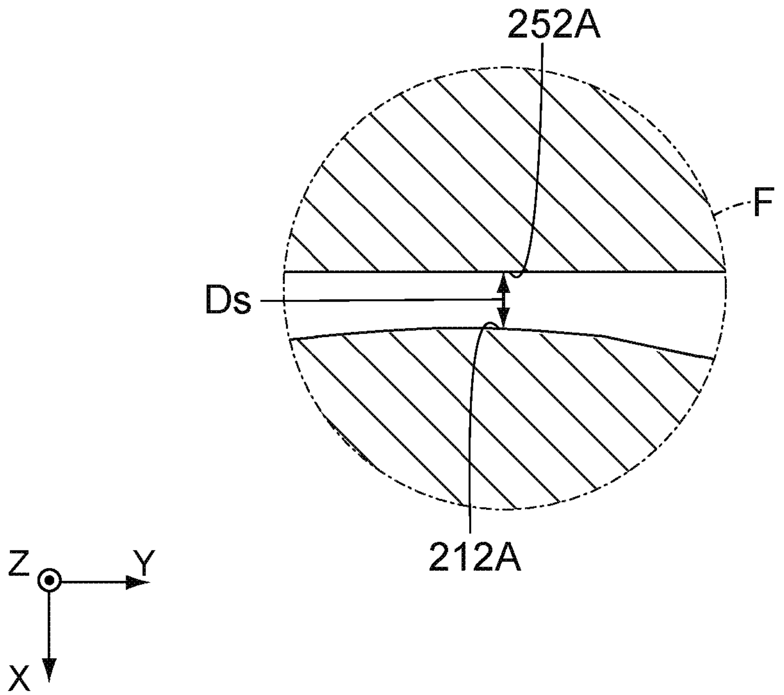
FIG. 21 is an enlarged view showing a part which is enclosed by dotted line F of FIG. 20.
Figure 22:
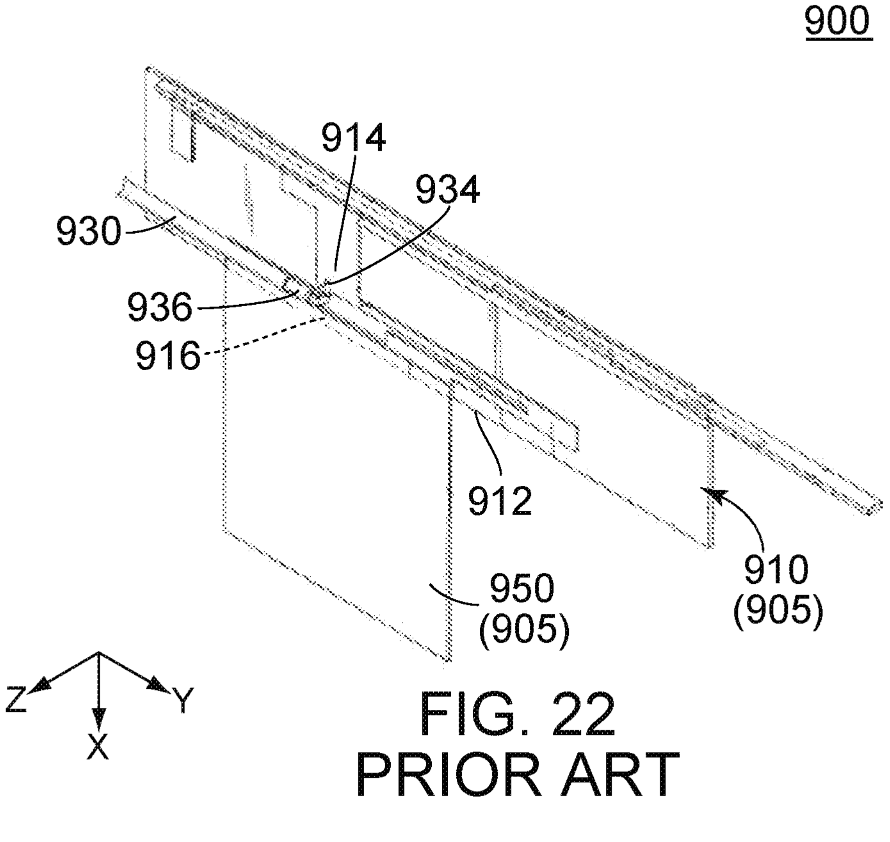
FIG. 22 PRIOR ART
FIG. 22 is a perspective view showing an antenna of Patent Document 1.

As shown in FIG. 21, the pressed portion 252A of the present embodiment faces forward in the front-rear direction. The pressed portion 252A has a flat-plate shape. Referring to FIGS. 17 and 21, the pressed portion 252A is positioned at a right end of the first side portion 204A in the right-left direction.

As shown in FIG. 15, the first side portion 204A is provided with a locked portion 270. In other words, the antenna body 200A is provided with the locked portion 270. The locked portion 270 is a plane facing rearward in the front-rear direction. The locked portion 270 is positioned leftward in the right-left direction beyond the piercing hole 240. The locked portion 270 is positioned at a position same as a position of the piercing hole 240 in the up-down direction. The locked portion 270 neighbors to the piercing hole 240 in the right-left direction.

As shown in FIG. 17, the arm portions 210A of the present embodiment extends from the first side portion 204A. In other words, the arm portions 210A extends from the antenna body 200A. The arm portion 210A extends rightward from the right end of the first side portion 204A, and is bent forward, and further extends leftward. A part of the arm portion 210A is positioned forward in the front-rear direction beyond the first side portion 204A. As understood from FIGS. 10 and 13, the arm portion 210A is resiliently deformable. The arm portion 210A has an end portion 215 which is provided with a lock portion 2152.

Figure 12:
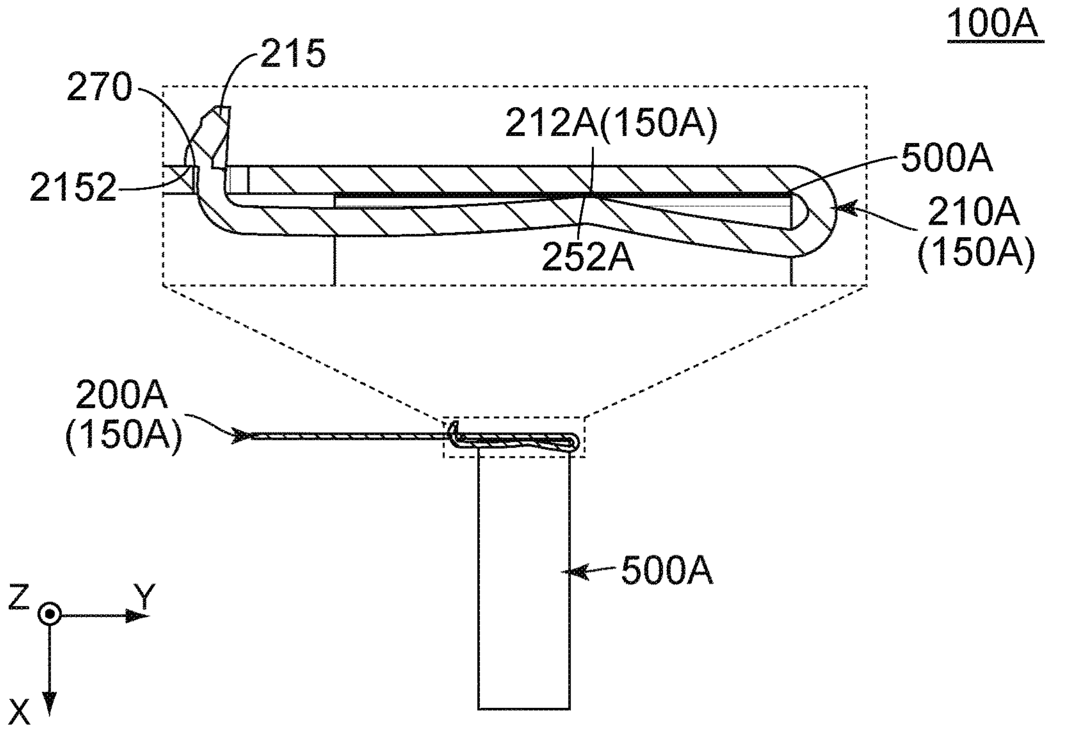
FIG. 12 is a cross-sectional view showing the antenna assembly of FIG. 11, taken along line B-B. In the figure, a part of the antenna assembly is enlarged and illustrated.

As shown in FIG. 15, the lock portion 2152 of the present embodiment faces forward in the front-rear direction. The lock portion 2152 is positioned at a left end of the arm portion 210A in the right-left direction. Referring to FIGS. 15 and 16, the lock portion 2152 is positioned leftward in the right-left direction beyond the pressing portion 212A. As shown in FIG. 12, the lock portion 2152 locks the locked portion 270.

As shown in FIG. 16, the pressing portion 212A of the present embodiment faces rearward in the front-rear direction. Referring to FIGS. 15 and 16, the pressing portion 212A is positioned around a middle of the arm portion 210A in the right-left direction. The pressing portion 212A is supported by the arm portion 210A. The pressing portion 212A is integrally formed with the arm portion 210A. In other words, the pressing portion 212A is integrally formed with the antenna body 200A (see FIG. 14). The pressing portion 212A is positioned at a position same as a position of the pressed portion 252A in the up-down direction. The pressing portion 212A is positioned at a position same as a position of the pressed portion 252A in the right-left direction. The pressing portion 212A is positioned forward in the front-rear direction beyond the pressed portion 252A. Referring to FIG. 13, the pressing portion 212A has a size greater than a size of the lock portion 2152 in the up-down direction.

As shown in FIG. 12, the conductive film 500A is partially sandwiched between the pressing portion 212A and the pressed portion 252A. Specifically, the pressing portion 212A presses the conductive film 500A against the pressed portion 252A and thereby the conductive film 500A and the pressed portion 252A are electrically connected to each other. More specifically, the pressing portion 212A presses the conductive film 500A against the pressed portion 252A along the front-rear direction and thereby the conductive film 500A and the pressed portion 252A are electrically connected to each other. As described above, the lock portion 2152 locks the locked portion 270. This maintains the electrical connection between the conductive film 500A and the pressed portion 252A.

Figure 20:
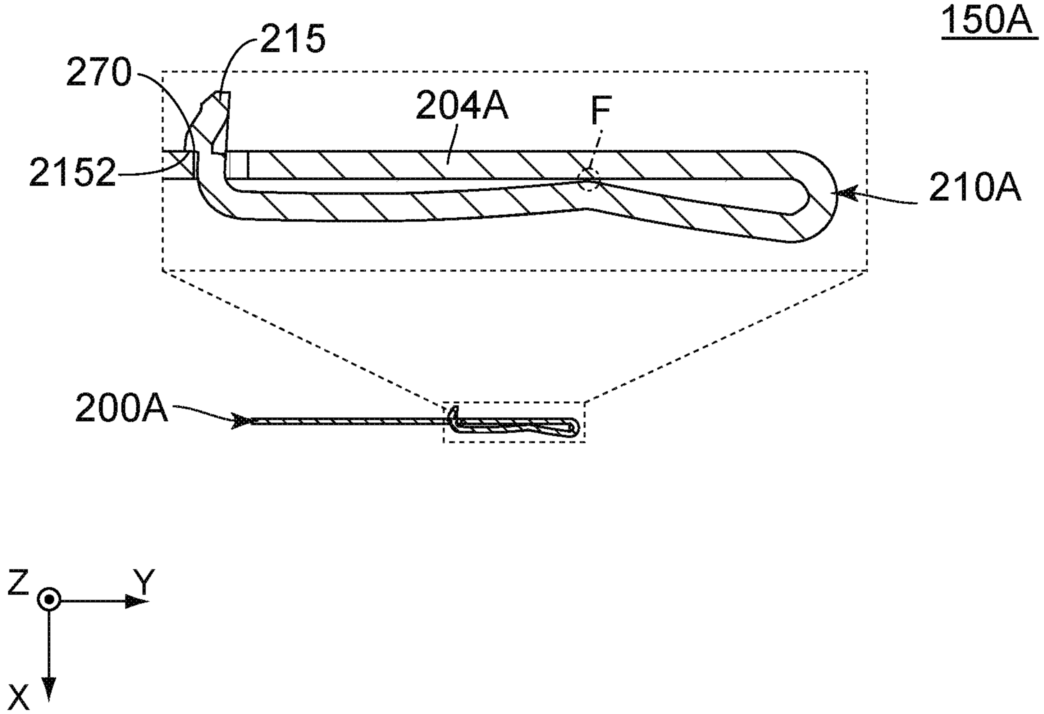
FIG. 20 is a cross-sectional view showing the antenna member of FIG. 19, taken along line E-E. In the figure, a part of the antenna member is enlarged and illustrated.

Referring to FIGS. 15 and 16, a distance Ds between the pressing portion 212A and the pressed portion 252A is greater than a thickness T of the conductive film 500A in a state before the locked portion 270 is locked by the lock portion 2152. Referring to FIGS. 16, 20 and 21, the distance Ds between the pressing portion 212A and the pressed portion 252A is smaller than the thickness T of the conductive film 500A in a state where the lock portion 2152 locks the locked portion 270 while the conductive film 500A is not sandwiched between the pressing portion 212A and the pressed portion 252A. Thus, as shown in FIG. 12, the conductive film 500A is partially sandwiched between the pressing portion 212A and the pressed portion 252A when the lock portion 2152 locks the locked portion 270 in a state where the conductive film 500A is positioned between the pressing portion 212A and the pressed portion 252A.

Referring to FIG. 17, the conductive film 500A of the present embodiment has a structure similar to that of the conductive film 500 of the first embodiment except that the conductive film 500A has no incision 510. Accordingly, detailed description thereabout is omitted.

(Operation of Fixing the Conductive Film to the Antenna Body)

Hereinafter, description will be made in detail about operation of fixing the conductive film 500A to the antenna body 200A.

First, referring to FIG. 17, the antenna member 150A and the conductive film 500A are prepared. In a state before the locked portion 270 is locked by the lock portion 2152, the antenna member 150A has a space 220A between the pressing portion 212A and the pressed portion 252A (see FIG. 16).

Next, the conductive film 500A is folded so that a section of the conductive film 500A extends upward. After that, the conductive film 500A is arranged below the antenna member 150A so that the section of the conductive film 500A is positioned just below the space 220A. Thus, the antenna assembly 100A results in a state shown in FIG. 17.

After that, the conductive film 500A is moved upward relative to the antenna member 150A. Thus, the antenna assembly 100A changes its state into a state shown in FIG. 13. In this state, the section of the conductive film 500A is positioned between the pressing portion 212A and the pressed portion 252A.

Under the state shown in FIG. 13, the lock portion 2152 is inserted into the piercing hole 240 by pushing the left end of the arm portion 210A rearward. Then, the lock portion 2152 locks the locked portion 270. Thus, the antenna assembly 100A changes its state into a state shown in each of FIGS. 10 to 12. In this state, the pressing portion 212A presses the conductive film 500A against the pressed portion 252A and thereby the conductive film 500A and the pressed portion 252A are electrically connected to each other. Accordingly, the antenna assembly 100A of the present embodiment is configured so that the conductive film 500A can be fixed to the antenna body 200A without soldering or the like. Thus, the antenna assembly 100A of the present embodiment can facilitate operation of fixing the conductive film 500A to the antenna body 200A.

Although the specific explanation about the present invention is made above referring to the embodiments, the present invention is not limited thereto and is susceptible to various modifications and alternative forms.

Although the antenna assembly 100 of the first embodiment has the two sets each consisting of the pressing portion 212 and the pressed portion 252, the present invention is not limited thereto. Specifically, the antenna assembly 100 should have a single set consisting of the pressing portion 212 and the pressed portion 252.

Although the antenna assembly 100A of the second embodiment has the single pressing portion 212A and the single pressed portion 252A, the present invention is not limited thereto. Specifically, the antenna assembly 100A may have two sets each consisting of the pressing portion 212A and the pressed portion 252A. In this case, each of the two sets electrically connects the antenna body 200A and the conductive film 500A with each other.

Although the antenna assembly 100A of the second embodiment is configured so that the first side portion 204A of the antenna body 200A is not formed with a hole which is equivalent to the receiving hole 250 of the first embodiment, the present invention is not limited thereto. Specifically, the antenna assembly 100A may be modified so that the first side portion 204A is formed with a hole which is equivalent to the receiving hole 250. It is noted that the modified antenna assembly 100A is configured as follows: similar to the first embodiment, a pressed portion 252A is provided at an edge of the hole; and a part of the conductive film 500A is pushed into the hole when the pressing portion 212A presses the conductive film 500A against the pressed portion 252A.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An antenna assembly comprising an antenna body made of metal plate, a pressing portion and a conductive film, wherein:

the antenna body is provided with a pressed portion;

the pressing portion presses the conductive film against the pressed portion and thereby the conductive film and the pressed portion are electrically connected to each other;

the antenna assembly further has an arm portion;

the arm portion extends from the antenna body;

the pressing portion is supported by the arm portion;

the pressing portion is integrally formed with the antenna body;

the conductive film is distinct and separated from the antenna body;

the conductive film is distinct and separated from the arm portion;

the conductive film and the pressed portion are in direct contact with each other; and the conductive film is sandwiched between the pressing portion and the pressed portion.

2. The antenna assembly as recited in claim 1, wherein:

the antenna body is formed with a receiving hole;

the receiving hole has an edge;

the pressed portion is provided at the edge of the receiving hole; and the pressing portion is partially received in the receiving hole in a state where a part of the conductive film is put between the pressing portion and the pressed portion, and thereby the pressing portion presses the conductive film against the pressed portion.

3. The antenna assembly as recited in claim 2, wherein the pressing portion has a tapered shape.

4. The antenna assembly as recited in claim 1, wherein:

the antenna body is provided with a locked portion;

the arm portion is resiliently deformable;

the arm portion has an end portion;

the end portion of the arm portion is provided with a lock portion;

the conductive film is partially sandwiched between the pressing portion and the pressed portion; and the lock portion locks the locked portion and thereby an electrical connection between the conductive film and the pressed portion is maintained.

5. The antenna assembly as recited in claim 4, wherein:

a distance between the pressing portion and the pressed portion is greater than a thickness of the conductive film in a state before the locked portion is locked by the lock portion; and the distance between the pressing portion and the pressed portion is smaller than the thickness of the conductive film in a state where the lock portion locks the locked portion while the conductive film is not sandwiched between the pressing portion and the pressed portion.

6. The antenna assembly as recited in claim 1, wherein:

the antenna body is provided with a feed line connection portion; and an electrical wire is configured to be connected to the feed line connection portion.

* * * * *